(12) United States Patent
Adrangi

(10) Patent No.: US 6,651,141 B2
(45) Date of Patent: Nov. 18, 2003

(54) SYSTEM AND METHOD FOR POPULATING CACHE SERVERS WITH POPULAR MEDIA CONTENTS

(75) Inventor: Farid Adrangi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 357 days.

(21) Appl. No.: 09/751,790

(22) Filed: Dec. 29, 2000

(65) Prior Publication Data

US 2002/0087797 A1 Jul. 4, 2002

(51) Int. Cl.⁷ .............................................. G06F 12/00
(52) U.S. Cl. ........................ 711/118; 711/133; 709/226
(58) Field of Search ........................ 707/200, 10, 205; 709/226; 711/118, 133

(56) References Cited

U.S. PATENT DOCUMENTS

| | | |
|---|---|---|
| 4,920,432 A | 4/1990 | Eggers et al. |
| 4,949,187 A | 8/1990 | Cohen |
| 4,949,248 A | 8/1990 | Caro |

(List continued on next page.)

FOREIGN PATENT DOCUMENTS

| | | |
|---|---|---|
| EP | 0 649 121 A2 | 10/1994 |
| EP | 0 651 554 A1 | 10/1994 |
| WO | WO9742582 A | 11/1997 |
| WO | WO 9859486 | 12/1998 |
| WO | WO 99 48246 A | 9/1999 |

OTHER PUBLICATIONS

Vin, Harrick, Multimedia Broadcasting Over The Internet: Part 1, Oct. 1998, IEEE Multimedia, IEEE Computer Society, US, vol. 5, NR.4, pp.: 78–82 XP000788442, ISN: 1070–986X—Entire document.

Rodriguez, P. et al, "Improving the WWW: Caching or Multicast?", Computer Networks and ISDN Systems, North Holland Publishing. Amsterdam, NL, vol. 30, No. 22–23 Nov. 1998, pp. 2223–2243, ISSN: 0169–7552.

Berra, P.B., et al., "Architecture for Distributed Database Systems," *Computer Communications*, vol. 13, No. 4, May 1, 1990, pp. 217–231.

Little, T.D.C., et al., "Selection and Disseminatrion of Digital Video via the Virtual Video Broswer," *Multimedia Tools and Applications*, vol. 1, No. 2, Jun. 1995 (Netherlands), pp. 149–172.

*Primary Examiner*—Jack A. Lane
(74) *Attorney, Agent, or Firm*—Blakely, Sokoloff, Taylor & Zafman LLP

(57) ABSTRACT

A system and method for caching files is disclosed. Popularity values are calculated for a plurality of files over a period of time. The popularity values are then used to determine which files should be cached at various remote sites. Once the caches are filled, the popularity values associated with the cached files are periodically compared with the popularity values of uncached content. Generally, if the popularity of an uncached file is greater than the popularity of a cached file, then the cached file will be replaced. However, numerous different variables may be factored into the caching determination including, for example, the size of the file, the required bitrate of the file, the identity of the owner of the file, and/or the type of file.

29 Claims, 7 Drawing Sheets

U.S. PATENT DOCUMENTS

| | | |
|---|---|---|
| 5,172,413 A | 12/1992 | Bradley et al. |
| 5,253,341 A | 10/1993 | Rozmanith et al. |
| 5,291,554 A | 3/1994 | Morales |
| 5,371,532 A | 12/1994 | Gelman et al. |
| 5,410,343 A | 4/1995 | Coddington et al. |
| 5,414,455 A | 5/1995 | Hooper et al. |
| 5,442,389 A | 8/1995 | Blahut et al. |
| 5,442,390 A | 8/1995 | Hooper et al. |
| 5,442,749 A | 8/1995 | Northcutt et al. |
| 5,475,615 A | 12/1995 | Lin |
| 5,508,732 A | 4/1996 | Bottomley et al. |
| 5,515,511 A | 5/1996 | Nguyen et al. |
| 5,519,435 A | 5/1996 | Anderson |
| 5,528,281 A | 6/1996 | Grady et al. |
| 5,544,313 A | 8/1996 | Shachnai et al. |
| 5,544,327 A | 8/1996 | Dan et al. |
| 5,550,577 A | 8/1996 | Verbiest et al. |
| 5,550,863 A | 8/1996 | Yurt et al. |
| 5,550,982 A | 8/1996 | Long et al. |
| 5,557,317 A | 9/1996 | Nishio et al. |
| 5,614,940 A | 3/1997 | Cobbley et al. |
| 5,774,660 A | 6/1998 | Brendel et al. |
| 5,778,187 A | 7/1998 | Monteiro et al. |
| 5,832,069 A | 11/1998 | Waters et al. |
| 5,845,090 A | 12/1998 | Collins, III et al. |
| 5,933,835 A | 8/1999 | Adams et al. |
| 5,951,694 A | 9/1999 | Choquier et al. |
| 5,956,716 A | 9/1999 | Kenner et al. |
| 6,003,030 A | 12/1999 | Kenner et al. |
| 6,016,509 A | 1/2000 | Dedrick |
| 6,016,512 A | 1/2000 | Huitema |
| 6,023,470 A | 2/2000 | Lee et al. |
| 6,070,191 A | 5/2000 | Narendran et al. |
| 6,081,840 A | 6/2000 | Zhao |
| 6,098,096 A * | 8/2000 | Tsirigotis et al. ............ 709/213 |
| 6,108,703 A | 8/2000 | Leighton et al. |
| 6,112,239 A | 8/2000 | Kenner et al. |
| 6,115,752 A | 9/2000 | Chauhan |
| 6,161,137 A | 12/2000 | Ogdon et al. |
| 6,233,623 B1 | 5/2001 | Jeffords et al. |
| 6,240,462 B1 | 5/2001 | Agraharam et al. |
| 6,266,335 B1 | 7/2001 | Bhaskaran |
| 6,317,787 B1 | 11/2001 | Boyd et al. |
| 6,324,582 B1 | 11/2001 | Sridhar et al. |
| 6,332,157 B1 | 12/2001 | Mighdoll et al. |
| 6,345,294 B1 | 2/2002 | O'Toole et al. |
| 6,351,776 B1 | 2/2002 | O'Brien et al. |
| 6,389,462 B1 | 5/2002 | Cohen et al. |
| 6,415,368 B1 * | 7/2002 | Glance et al. ............... 711/158 |
| 6,421,714 B1 | 7/2002 | Rai et al. |
| 6,427,170 B1 | 7/2002 | Sitaraman et al. |
| 6,442,588 B1 | 8/2002 | Clark et al. |
| 6,466,949 B2 | 10/2002 | Yang et al. |
| 6,484,143 B1 | 11/2002 | Swildens et al. |
| 6,487,555 B1 | 11/2002 | Bharat et al. |
| 6,502,125 B1 | 12/2002 | Kenner et al. |
| 6,502,205 B1 | 12/2002 | Yanai et al. |

* cited by examiner

Request History List 500

| Content Name | First Miss Time | # Misses | Last Miss Time | Other Variables | Popularity |
|---|---|---|---|---|---|
| Foo | 6/6/00 13:50 | 50 | 6/7/00 3:15 | .... | X |
| Bar | 6/7/00 1:05 | 23 | 6/7/00 3:02 | .... | Y |
| Zoo | 6/6/00 2:20 | 102 | 6/7/00 2:25 | .... | Z |
| .... | .... | .... | .... | .... | .... |

FIG. 5a

Hit History List 510

| Content Name | First Hit Time | # Hits | Last Hit Time | Other Variables | Popularity |
|---|---|---|---|---|---|
| Soo | 6/6/00 19:45 | 75 | 6/7/00 3:15 | .... | A |
| Far | 6/7/00 2:56 | 1003 | 6/7/00 3:02 | .... | B |
| Boo | 6/6/00 2:20 | 1 | 6/7/00 2:25 | .... | C |
| .... | .... | .... | .... | .... | .... |

FIG. 5b

SYSTEM AND METHOD FOR POPULATING CACHE SERVERS WITH POPULAR MEDIA CONTENTS

BACKGROUND

1. Field of the Invention

This invention relates generally to the field of network services. More particularly, the invention relates to an improved architecture for network content distribution.

2. Description of the Related Art

A traditional network caching system, as illustrated in FIG. 1, includes a plurality of clients 130-133 communicating over a local area network 140 and/or a larger network 110 (e.g., the Internet). The clients 130-133 may run a browser application such as Netscape Navigator™ or Microsoft Internet Explorer™ which provides access to information on the World Wide Web ("the Web") via the HyperText Transport Protocol ("HTTP"), or through other networking protocols (e.g., the File Transfer Protocol, Gopher . . . etc).

The browser on each client 130-133 may be configured so that all requests for information (e.g., Web pages) are transmitted through a local cache server 115, commonly referred to as a "proxy cache." When a client 130 requests information from a remote Internet server 120, the local proxy cache 115 examines the request and initially determines whether the requested content is "cacheable" (a significant amount of Internet content is "non-cacheable"). If the local proxy cache 115 detects a non-cacheable request, it forwards the request directly to the content source (e.g., Internet server 120). The requested content is then transmitted directly from the source 120 to the client 130 and is not stored locally on the proxy cache 115.

By contrast, when the proxy cache 115 determines that a client 130 content request is cacheable, it searches for a copy of the content locally (e.g., on a local hard drive). If no local copy exists, then the proxy cache 115 determines whether the content is stored on a "parent" cache 117 (located further upstream in the network relative to the Internet server 120) or a "sibling" cache 116 (located in substantially the same hierarchical position as the proxy cache relative to the Internet server 120 from which the content was requested).

If a cache "hit" is detected on either neighboring cache 116, 117, the requested content is retrieved from that cache, transmitted to the client 130, and is stored locally on the proxy cache 115 to be available for future requests by other local clients 131-133. If a cache "miss" occurs, however, the content is retrieved from the source Internet server 120, transmitted to the client 130 and a copy is stored locally on the proxy cache 115, and possibly also the parent cache 117, to be available for future client requests.

One problem which exists with the foregoing arrangement, however, is that caching content based on a "first miss" algorithm (i.e., caching content locally as soon as it is requested) is extremely inefficient and does not necessarily result in a greater future cache hit ratio. For example, the foregoing system may replace more popular content with less popular content as long as the less popular content was requested more recently Moreover, prior systems do not factor in other variables (e.g., content size, content type, . . . etc) which may dramatically affect caching performance. While these prior systems may be adequate for caching Web pages and other relatively small network files, they are extremely inefficient at caching larger content types (e.g., multimedia files) which consume significantly more storage capacity and network bandwidth. For example, implementing a first-miss algorithm with multimedia files may result in continual replacement of files at the cache site due to limited storage capacity. Accordingly, what is needed is a more intelligent system and method for caching popular network content.

BRIEF DESCRIPTION OF THE DRAWINGS

A better understanding of the present invention can be obtained from the following detailed description in conjunction with the following drawings, in which:

FIG. 5a illustrates a request history list employed by embodiments of the invention.

FIG. 5b illustrates a hit history list employed by embodiments of the invention.

DETAILED DESCRIPTION

AN EXEMPLARY NETWORK ARCHITECTURE

Figure 1:
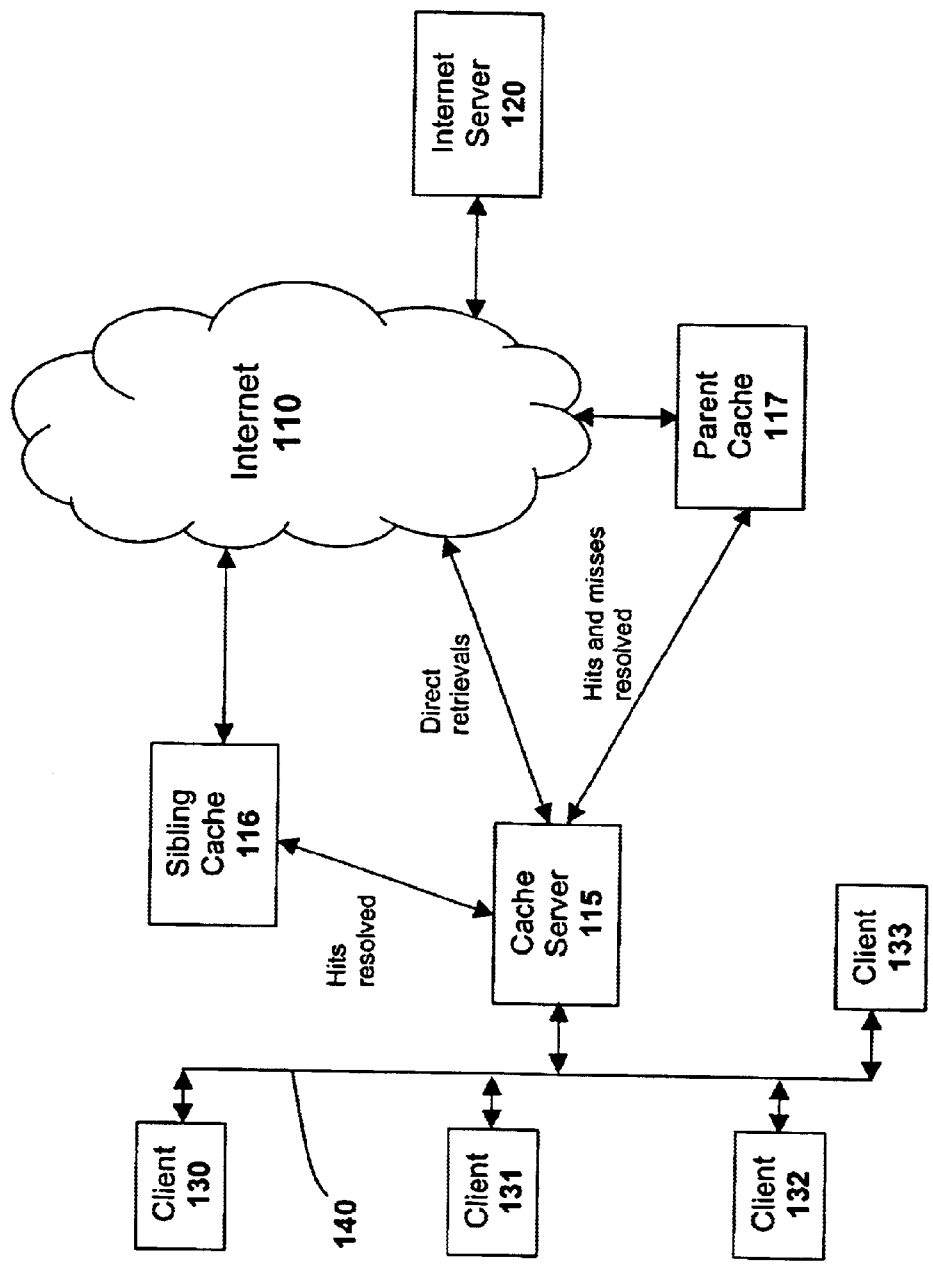
FIG. 1 illustrates a prior art caching system implemented on a data network.
Figure 2:
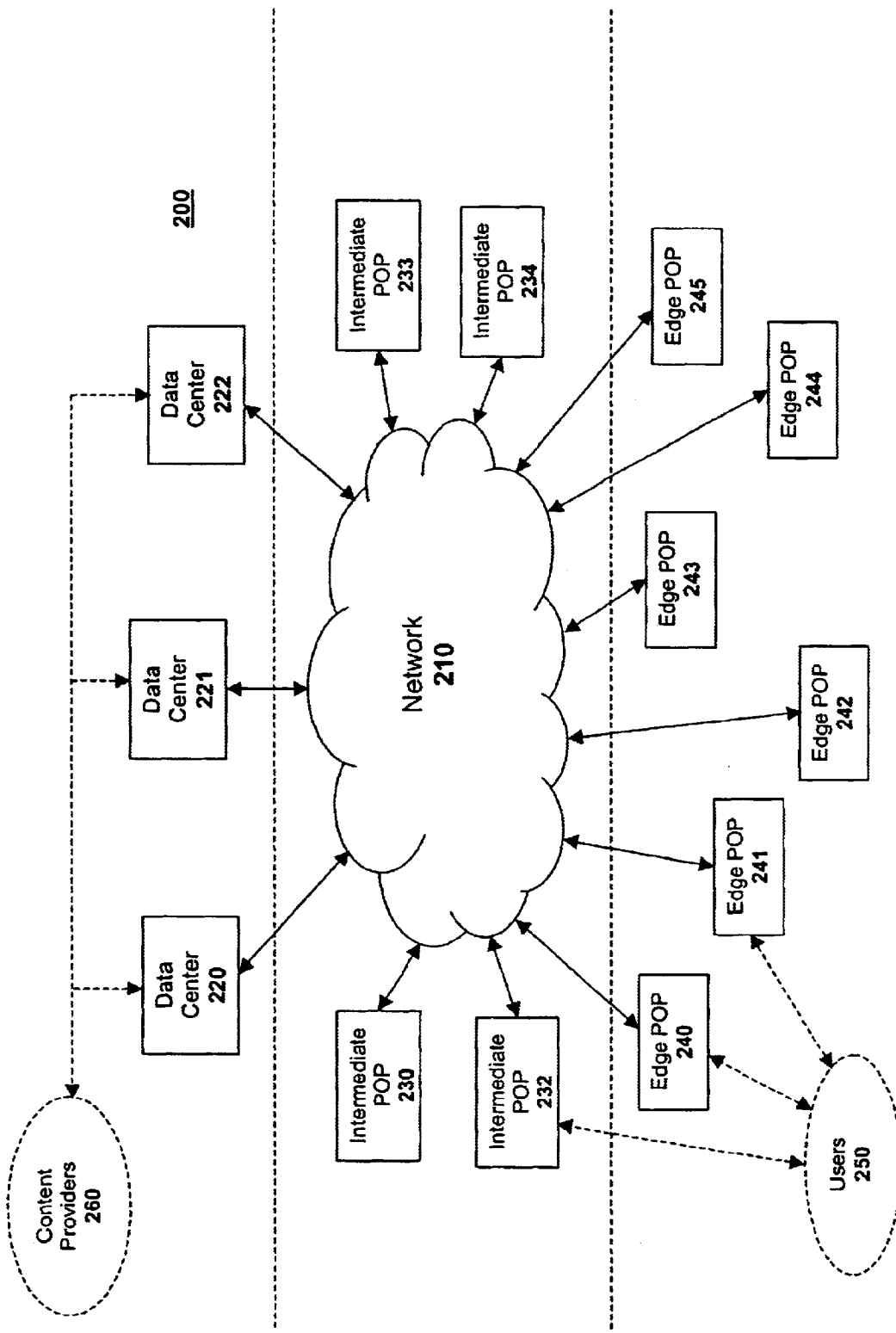
FIG. 2 illustrates an exemplary network architecture including elements of the invention.

Elements of the present invention may be included within a multi-tiered networking architecture 200 such as that illustrated in FIG. 2, which includes one or more data centers 220-222, a plurality of "intermediate" Point of Presence ("POP") nodes 230-234 (also referred to herein as "Private Network Access Points," or "P-NAPs"), and a plurality of "edge" POP nodes 240-245 (also referred to herein as "Internet Service Provider Co-Location" sites or "ISP Co-Lo" sites).

According to the embodiment depicted in FIG. 2, each of the data centers 220-222, intermediate POPs 230-234 and/or edge POPs 240-245 are comprised of groups of network servers on which various types of network content may be stored and transmitted to end users 250, including, for example, Web pages, network news data, e-mail data, File Transfer Protocol ("FTP") files, and live & on-demand multimedia streaming files. It should be noted, however, that the underlying principles of the invention are not limited to any particular content type.

The servers located at the data centers 220-222 and POPs 230-234; 240-245 may communicate with one another and with end users 150 using a variety of communication channels, including, for example, Digital Signal ("DS") channels (e.g., DS-3/T-3, DS-1/T1), Synchronous Optical Network ("SONET") channels (e.g., OC-3/STS-3), Integrated Services Digital Network ("ISDN") channels, Digital Subscriber Line ("DSL") channels, cable modem channels and a variety of wireless communication channels including satellite broadcast and cellular.

In addition, various networking protocols may be used to implement aspects of the system including, for example, the Asynchronous Transfer Mode ("ATM"), Ethernet, and Token Ring (at the data-link level); as well as Transmission Control Protocol/Internet Protocol ("TCP/IP"), Internetwork Packet Exchange ("IPX"), AppleTalk and DECnet (at the network/transport level). It should be noted, however, that the principles of the invention are not limited to any particular communication channel or protocol.

In one embodiment, a database for storing information relating to distributed network content is maintained on servers at the data centers 220-222 and/or at the POP nodes 230-234; 240-245. The database in one embodiment is a distributed database (i.e., spread across multiple servers) and may run an instance of a Relational Database Management System (RDBMS), such as Microsoft™ SQL-Server, Oracle™ or the like.

AN EXEMPLARY COMPUTER ARCHITECTURE

Figure 3:
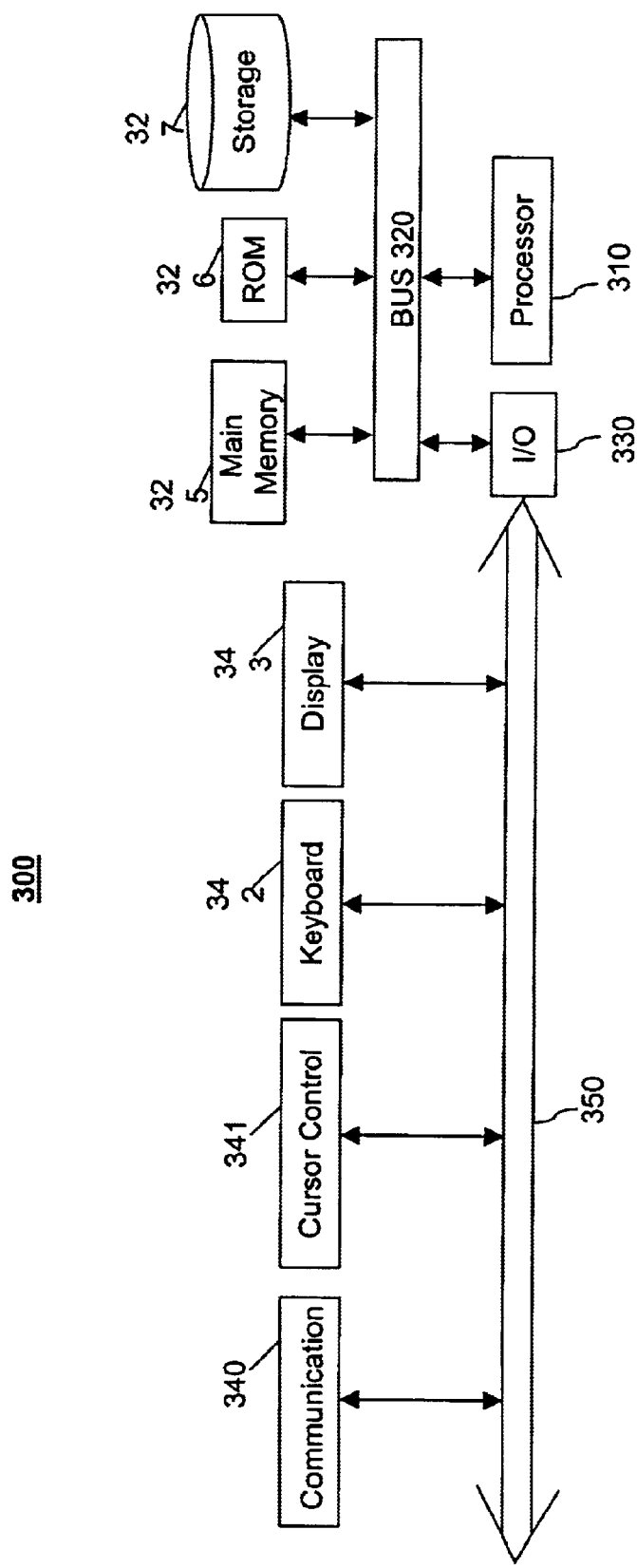
FIG. 3 illustrates an exemplary computer architecture including elements of the invention.

Having briefly described an exemplary network architecture which employs various elements of the present invention, a computer system 300 representing exemplary clients and servers for implementing elements of the present invention will now be described with reference to FIG. 3.

One embodiment of computer system 300 comprises a system bus 320 for communicating information, and a processor 310 coupled to bus 320 for processing information. The computer system 300 further comprises a random access memory (RAM) or other dynamic storage device 325 (referred to herein as "main memory"), coupled to bus 320 for storing information and instructions to be executed by processor 310. Main memory 325 also may be used for storing temporary variables or other intermediate information during execution of instructions by processor 310. Computer system 300 also may include a read only memory ("ROM") and/or other static storage device 326 coupled to bus 320 for storing static information and instructions used by processor 310.

A data storage device 327 such as a magnetic disk or optical disc and its corresponding drive may also be coupled to computer system 300 for storing information and instructions. The computer system 300 can also be coupled to a second I/O bus 350 via an I/O interface 330. A plurality of I/O devices may be coupled to I/O bus 350, including a display device 343, and/or an input device (e.g., an alphanumeric input device 342 and/or a cursor control device 341).

The communication device 340 is used for accessing other computers (servers or clients) via a network 210. The communication device 340 may comprise a modem, a network interface card, or other well known interface device, such as those used for coupling to Ethernet, token ring, or other types of computer networks.

EMBODIMENTS OF THE INVENTION

Referring back to FIG. 2, as used herein, a "content provider" 260 refers to an individual or organization with content to be distributed to end users 250 via the system and method described herein. The "content distribution service" refers to a service offered to content providers 260 by an individual or organization implementing embodiments of the network content distribution system and method described herein.

In one embodiment of the system, the data centers 220-222 serve as the primary initial repositories for network content. Thus, when a content provider 260 generates a file to be distributed to end users 250, such as, e.g., a new streaming media presentation, the content provider 260 will initially upload the content to a streaming server located at a data center 220-222. Alternatively, the content may be loaded by a member of the data center 220-222 operations staff. The file will then be automatically distributed from the data center 220-222 to one or more of the intermediate POPs 230-234, and/or edge POPs 240-245 based on an automated content distribution policy and/or end-user demand for the file (as described in more detail below).

Because the data centers 220-222 must be capable of storing and transmitting vast amounts of content provider 260 data, these facilities may be equipped with disk arrays capable of storing hundreds of terabytes of data (based on current capabilities; eventually the data centers 220-222 may be equipped with substantially greater storage capacity based on improvements in storage technology). In addition, the data centers are provided with high-bandwidth connectivity to the other data centers 220-222, intermediate POPs 230-234 and, to some extent, edge POPs 240-245. In addition, in one embodiment, the data centers 220-222 are manned at all times by an operations staff (i.e., 24-hours a day, 7 days a week).

More intermediate POPs 230-234 than data centers 220-222 are implemented in one embodiment of the system. Individually, however, the intermediate POPs 230-234 may be configured with a relatively smaller on-line storage capacity (several hundred gigabytes through one or two terabytes of storage) than the data centers 230-234. The intermediate POPs 230-234 in one embodiment are geographically dispersed across the world to provide for a more efficient content distribution scheme. These sites may also be remotely managed, with a substantial amount of network and system management support provided from the data centers 220-222 (described in greater detail below).

The edge POPs 240-245 are facilities that, in one embodiment, are smaller in scale compared with the intermediate POPs 230-234. However, substantially more geographically-dispersed edge POPs 240-245 are employed relative to the number intermediate POPs 230-234 and data centers 220-222. The edge POPs may be comprised of several racks of servers and other networking devices that are co-located with a facility owner (e.g., an Internet Service Provider). Some of the edge POPs 240-245 are provided with direct, high bandwidth connectivity (e.g., via a T1 channel or greater) to the network 210, whereas other edge POPs 240-245 are provided with only a low bandwidth "control" connectivity (e.g., typically a dial-up data connection (modem) at the minimum; although this may also include a fractional T-1 connection). Even though certain edge POP sites 230-234 are connected to the rest of the system over the Internet, the connection can be implemented such that the edge POPs 240-245 are part of a virtual private network ("VPN") that is administered from the data centers 220-222. Like the intermediate POPs 230-234, the edge POPs 240-245 may be remotely managed with network and system management support from one or more of the data centers 220-222.

Systems resources (e.g., servers, connectivity) may be deployed as modular units that can be added at data centers 220-222, intermediate POPs 230-234, and edge POPs 240-245 based on demand for particular types of content. This modularity provides for scalability at the "local" level; scalability at the "global" scope (system wide) is supported through addition of intermediate POPs 230-234 and edge POPs 240-245 as needed by the growth in content provider 260 base and additions/changes to the content distribution service. "Local" level in this context means within a data center, intermediate POP or an edge POP. As an example, if a particular edge POP was configured with 5 streaming servers to provide, say, 5000 streams as the total capacity at that "edge", the edge POP capacity may be scaled (in accordance with one embodiment of the invention) to higher/lower values (say, to 3000 streams or 10,000 streams) depending on projected demand, by removing/adding streaming servers. On a "global," or system-wide scope, scalability can be achieved by adding new POPs, data centers and even subscribing/allocating higher bandwidth for network connections.

The three-tiered architecture illustrated in FIG. 2 provides for an optimal use of network 210 bandwidth and resources. By transmitting data to end users 250 primarily from edge POPs 240-245, long-haul connectivity (e.g., serving users 250 directly from the content source) is reduced, thereby conserving network bandwidth. This feature is particularly useful for applications such as real-time multimedia streaming which require significant bandwidth and storage capacity. As a result, end users experience a significantly improved quality of service as content delivery from edge POPs 240-245 avoids the major bottlenecks in today's networks. It should be noted, however, that the underlying principles of the invention do not require a three-tiered distribution system (i.e., elements of the invention may be implemented on a two-tiered system or, alternatively, a four-tiered (or greater) system.

Figure 4:
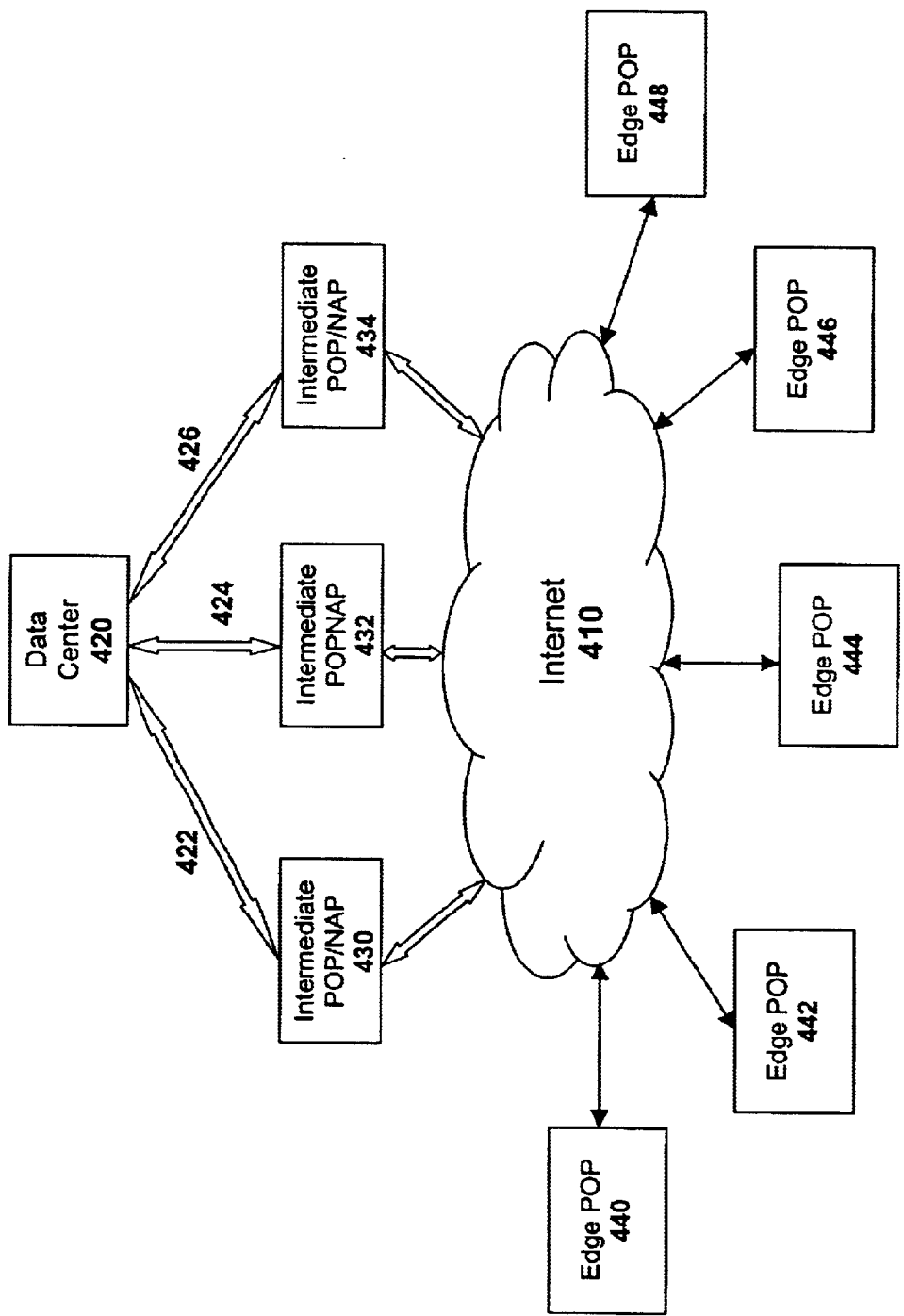
FIG. 4 illustrates another embodiment of a network architecture including elements of the invention.

In one particular embodiment of the system, illustrated in FIG. 4, private, high-speed communication channels 422, 424, and 426 are provided between the data centers 420 and the intermediate POPs 430, 432, and 434, all of which may be owned by the same organization. By contrast, the edge POPs 440-448 in this embodiment are connected to the intermediate POPs 430, 432, 434 and data centers 420 over the Internet (i.e., over public communication channels).

In order to populate the various network sites/servers with the most popular files, one embodiment of the invention maintains a request history list and/or a file hit history list for determining whether a particular file should be cached locally (i.e., at an I-POP or an E-POP). As illustrated in FIG. 5a, an exemplary file request history list 500 includes data such as the time at which the file was initially requested ("First Miss Time"), the number of requests since the initial request ("# Misses"), and the last time that the file was requested ("Last Request Time"). In one embodiment, the popularity value for the requested content ("Popularity") in the request history list is computed periodically and is used to determine whether or not the content should be cached at the network cache server (i.e., the computed popularity value is used to forecast the future demand for the various media files). More specifically, in one embodiment, a base popularity value of the content in request-history list is computed as follows: Popularity=Number of Requests/Elapsed Time (i.e., where Elapsed Time is the time from the first request until the time of the popularity computation).

The popularity may be calculated after a certain amount of time has passed (e.g., every five minutes) and/or after a predetermined number of requests for the file have been recorded, referred to herein as the "miss-count threshold." The miss-count threshold may be configured manually or dynamically based on the existing or predicted load on the network cache server, the network cache server popularity (e.g., the number of users who stream content from the server), and the cache size. In one embodiment, when the miss count threshold is exceeded for one or more files, the popularity of only those files is recalculated (e.g., the popularity of the other files having already been calculated on a periodic basis). When the popularity values have been recalculated, in one embodiment, the files with the highest popularity values in the request history list will be selected for caching until the space at the network cache server is exhausted.

Figure 6:
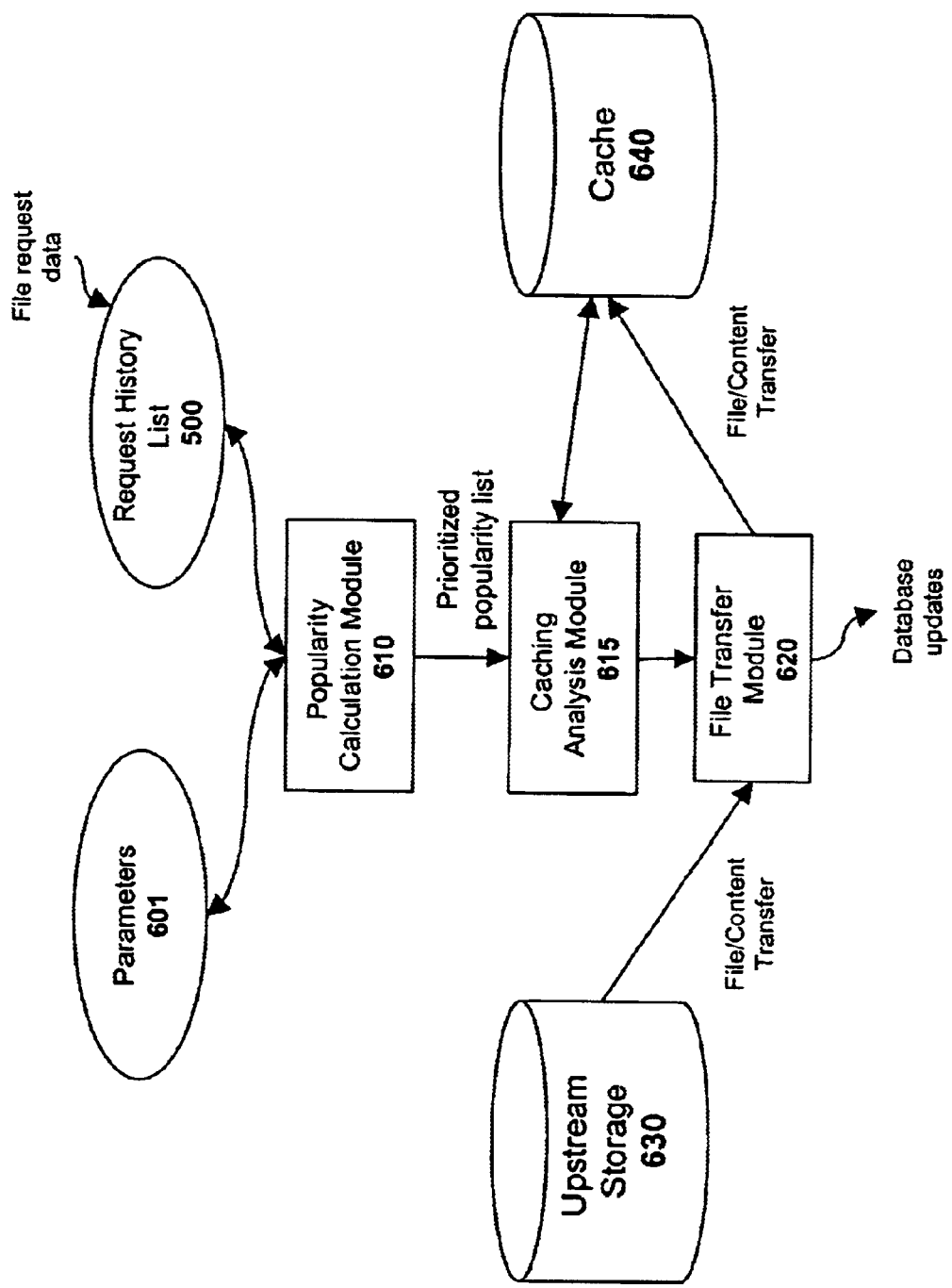
FIG. 6 illustrates one embodiment of the invention for caching network content based on popularity.

One embodiment of the invention, illustrated in FIG. 6, is comprised of one or more popularity calculation modules 610 for generating a prioritized list of files/content to be transferred to the cache 640 based on the request history list 500 and/or other popularity parameters 601 (e.g., in one embodiment, the popularity calculation modules 610 perform the file popularity calculations described herein). For example, in one embodiment, the popularity calculation module 610 starts with the base popularity formula set forth above (i.e., Popularity=Number of Requests/Elapsed Time) and factors in other parameters to arrive at a weighted popularity value. For example, one embodiment calculates file "popularity" using factors other than the number of file requests over time (represented by the "other variables" column in the request history list 500 and the hit history list 510). These other factors may include, but are not limited to, the type of file requested (which may include a minimum or a preferred bitrate at which the requested file should be transmitted), the size of the requested file, the source of the file (i.e., who the content provider is), and/or the network bandwidth at the POP site. Accordingly, as used in the context of this embodiment, the "popularity" values calculated by the popularity calculation module 610 may be weighted based on factors other than raw popularity.

For example, in one embodiment, larger files may be weighted as relatively less popular than small files to discourage caching of large files (i.e., thereby conserving space on caches with limited storage capacity and conserving system bandwidth). Accordingly, file size may be factored into the popularity equation as follows: Popularity=Number of Requests/(Elapsed Time * File Size). Similarly, files of a particular type (e.g., streaming media files) may be weighted as more or less popular, depending on the circumstances. For example, a video of a news broadcast may not require extremely high quality video because users tend to watch newscasts for informational purposes. By contrast, users may tend to demand higher quality audio/video for movies or music videos. Accordingly, one embodiment of the popularity calculation module 610 will weigh these factors when making popularity calculations (e.g., by dividing by a predetermined value for newscast files and/or multiplying by a predetermined value for movie files). Similarly, content stored in a particular file format may be weighted differently, depending on the circumstances (e.g., RealVideo® 8 files may be weighted higher than other media file formats).

A preferred and/or minimum bitrate may also be factored into the calculation. For example, to conserve overall network bandwidth it might be beneficial to cache high bitrate files as close to the end user as possible. However, because high bitrate files may, in some cases, take up a significant amount of storage space, it might not be beneficial to cache these files at certain locations. Thus, an equation which factors in both bitrate and size might look like the following: Popularity=(Number of Requests * Bitrate)/(Elapsed Time * File Size). In one embodiment of the invention, the variables in the equations described herein may be normalized before being used (e.g., 'file size' and/or 'bitrate' may be normalized using integers between 1 to 10).

In one embodiment, the source of the file—i.e., the identity of the content provider—may also be used to affect the file's popularity. For example, a particular content provider may wish to have its content distributed to as many caches across the network as possible (e.g., it may agree to pay a higher fee to the individual/organization implementing the system and method described herein to distribute the content in this manner). As such, files owned or provided by certain "preferred" content providers may be weighted with a higher popularity value relative to other content providers.

Once the popularity calculation module 610 is finished performing popularity calculations, in one embodiment, it generates a prioritized popularity list with the most popular files at the top of the list and the least popular files at the bottom. The list is read by a caching analysis module 615 which makes the final determination as to which files are to be cached. In one embodiment, the caching analysis module 615 will transmit files in the prioritized list to the cache 640 (e.g., starting from the highest priority files and working down the list) unless/until the cache is full, at which point the caching analysis module 615 may invoke one or more of the cache replacement techniques described below.

Once the caching analysis module 615 determines that a particular file should be cached, in one embodiment, it instructs a file transfer module 620 to carry out the underlying file transfers (e.g., by invoking Win32 or FTP commands; the latter for transfers over the Internet). In one embodiment, after the file transfer is complete, the file transfer module 620 updates a file/content database (not shown) to indicate whether the transfer was successful and where the file was copied (i.e., in one embodiment a central database tracks files as they are distributed throughout the system).

One embodiment of the system and method also includes a pruning function to remove aged entries in the request history list 500 (i.e., file/content request entries whose last request-time has occurred longer than some tolerable threshold). The pruning function helps normalize the request history list by eliminating large time gaps between requests. For example, if one request for file 'Foo' is recorded at 8 AM and seven requests are recorded between 4 PM and 5 PM; and seven requests for file 'Bar' are recorded between 4 PM and 5 PM, file 'Foo' will be assigned a lower popularity value without a pruning function in place due to the 8 AM request/hit (i.e., because the elapsed time will be significantly longer for the 'Foo' calculation). However, if a pruning function is configured to remove entries after, for example, four hours of inactivity (i.e., no requests for the file), then the 8 AM request entry will be dropped and 'Foo' and 'Bar' will more accurately be assigned equal popularity values (i.e., if popularity is calculated some time shortly after 5 PM). In this manner, the entries for the request history list 500 as a whole are normalized within a particular period of time. Mathematically, one embodiment employs the following logical formula to execute the pruning function: If (current-time—last request time)>(configurable tolerable threshold) then prune the file request entry.

As described briefly above, once the cache 640 is filled, one embodiment of the invention employs a least popular file replacement policy for replacing files stored in the cache. More specifically, in addition to the request history list, one embodiment also maintains a hit history list 510 (FIG. 5*b*) indicating how frequently files/content stored in the cache are requested. The entries in the hit history list are then periodically compared with the entries in the request history list to determine whether files already stored in the cache should be evicted (hereinafter referred to as "victims"). One goal of the least popular file replacement policy is to evict the files in cache only if they are less popular than the files waiting to be cached. As illustrated in FIG. 5*b*, one embodiment of the hit history list contains variables such as the date/time of the first-time hit ("First Time Hit"), the number of hits since the first hit ("# Hits"), and the last-hit time ("Last Hit Time") for the cached content. The computed popularity in the hit history list may be referred to as the "post popularity value" whereas the computed popularity in the request history list may be referred to as the "pre-popularity value."

Figure 7:
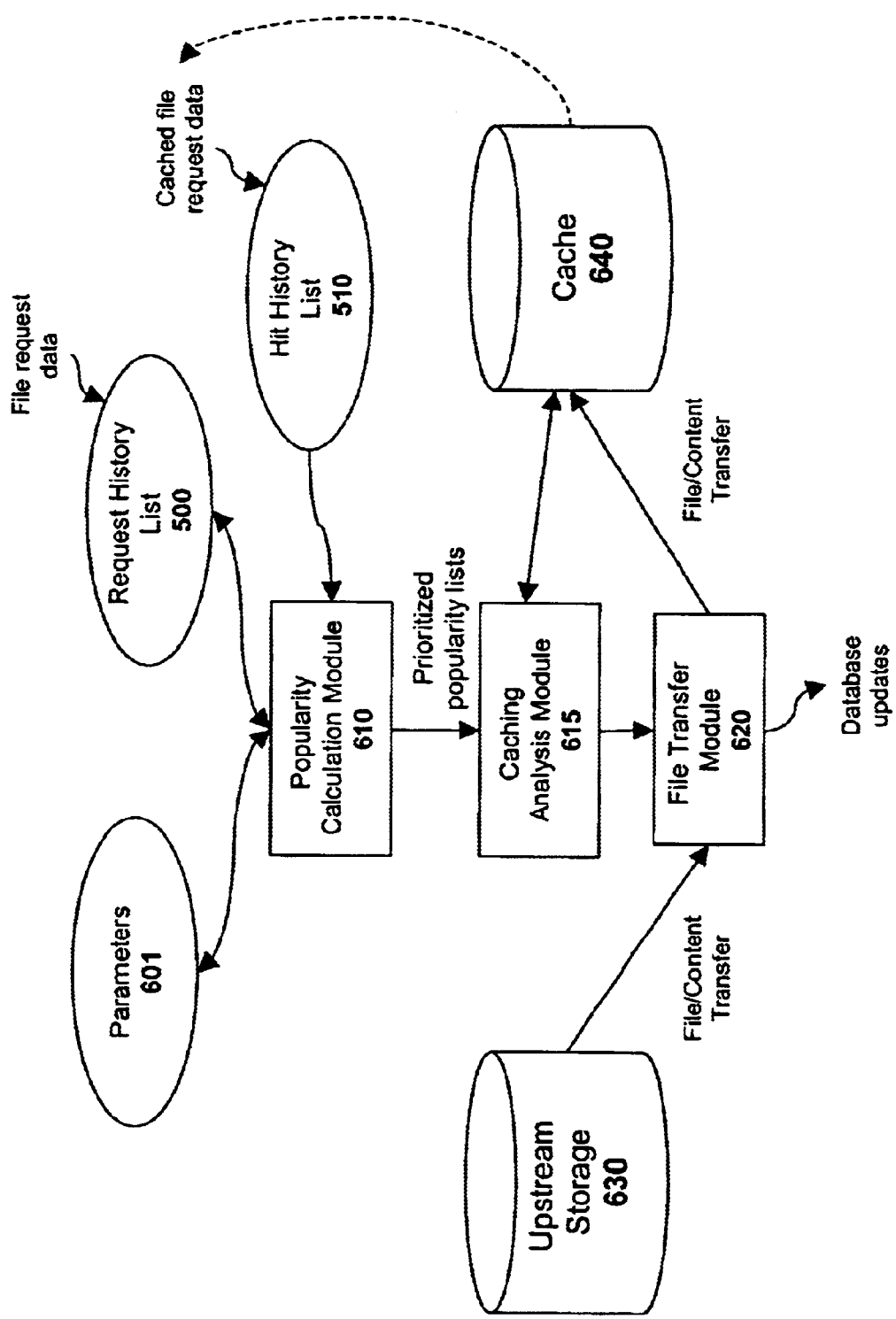
FIG. 7 illustrates one embodiment of the invention which employs a hit history list and a request history list.

The same popularity calculations described herein with respect to pre-popularity values may also be used to compute post-popularity values (i.e., except that the formula will be based on number of cache hits rather than number of file requests). For example, in one specific embodiment illustrated in FIG. 7, the popularity calculation module 610 calculates a prioritized popularity list for the cached data (i.e., based on the "hit history list") as well as for the non-cached data (i.e., based on the "request history list" as described above). Alternatively, a different set of equations/parameters may be applied for cached media content (e.g., weighing in favor of not evicting certain types of media content from the cache 640). The underlying principles of the invention remain the same regardless of the particular set of equations/parameters used by the popularity calculation module 610.

The caching analysis module 615 (once it determines that the cache is full) compares the prioritized popularity results of the hit history list 510 with the results of the request history list 500 before making a caching determination (e.g., before evicting cached data in favor of non-cached data). In one embodiment, it will simply replace any cached files with non-cached files that have a lower popularity value. In one embodiment, however, the caching analysis module 615 may not to replace a cached file unless the non-cached file has a significantly higher popularity value. For example, if a cached file has a popularity value of 10 and a non-cached file has a relative popularity value of 10.15, this difference (0.15) may not be significant enough to warrant evicting the cached file in favor of the non-cached file and consuming network bandwidth in the process. Various popularity difference thresholds may be set for different file types consistent with the underlying principles of the invention.

Once the caching determination is made, the caching analysis module 615 directs the file transfer module 620 to delete specified files in the cache 640 and to transfer more popular files to the cache from an upstream storage facility (e.g., the Web server from which the file was requested). In addition, in one embodiment, the file transfer modules 620 provide database updates to indicate the content changes at the cache 640 as described above.

It should be noted that the equations described herein are used merely to illustrate how file popularity may be weighted based on variables other than actual popularity. Accordingly, various other equations may be employed to weight different "popularity" parameters while still complying with the underlying principles of the invention.

Embodiments of the present invention include various steps, which have been described above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the invention may be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnet or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention (e.g., popularity equations). It will be apparent, however, to one skilled in the art that the invention may be practiced without some of these specific details. Accordingly, the scope and spirit of the invention should be judged in terms of the claims which follow.

What is claimed is:

1. A method for network caching comprising:
    calculating popularity values for a plurality of network files, said popularity values based on a number of requests for each of said files over a period of time; and
    transferring a subset of said plurality of network files to a cache based on said calculated popularity values.

2. The method as in claim 1 wherein calculating further comprises:
    pruning one of said requests from said popularity value calculation if a subsequent request for a particular file is not received after a specified period of time.

3. The method as in claim 1 further comprising:
    calculating popularity values for files stored in said cache; and
    replacing one or more of said files in said cache with one or more of said plurality of files not in said cache having higher popularity values when said cache is full.

4. The method as in claim 1 further comprising:
    storing a popularity value associated with each file in a file request history list.

5. The method as in claim 4 wherein said popularity values are calculated for each file after a predetermined miss-count threshold is reached.

6. The method as in claim 4 wherein said popularity values are calculated after a predetermined period of time.

7. The method as in claim 1 wherein said popularity values are calculated using the equation: Popularity=Number of Requests/Elapsed Time.

8. The method as in claim 1 wherein said popularity values are further based on file size.

9. The method as in claim 1 wherein said popularity values are further based on file type.

10. The method as in claim 1 wherein said popularity values are further based on identities of content providers providing said files.

11. A system for caching files comprising:
    one or more popularity calculation modules to calculate popularity values for a plurality of files based at least in part on a number of user requests for each of said plurality of files and to generate a prioritized list of said plurality of files based on said popularity values; and
    one or more caching analysis modules to identify one or more of said plurality of files to be cached based on said prioritized list; and
    one or more file transfer modules to transfer said one or more of said plurality of files to a cache.

12. The system as in claim 11 further comprising:
    pruning logic to prune one or more of said requests from said popularity value calculation if a subsequent user request for a particular file is not received after a specified period of time.

13. The system as in claim 11 wherein said popularity calculation modules further:
    calculate popularity values for files stored in said cache; and
    replace one or more of said files in said cache with one or more of said plurality of files not in said cache having higher popularity values when said cache is full.

14. The system as in claim 11 further comprising:
    a file request history list employed by said popularity calculation modules to calculate and store said popularity values associated with said files.

15. The system as in claim 14 wherein said popularity values are calculated for each file after a predetermined miss-count threshold is reached.

16. The system as in claim 11 wherein said popularity calculation modules calculate said popularity values using the equation: Popularity=Number of Requests/Elapsed Time.

17. The system as in claim 11 wherein popularity calculation modules factor in file size when calculating said popularity.

18. The method as in claim 11 wherein popularity calculation modules factor in file type when calculating said popularity.

19. The method as in claim 11 wherein said popularity calculation modules factor in identities of content providers providing said files when calculating said popularity values.

20. An article of manufacture including a sequence of instructions which, when executed by a processor, causes said processor to:
    calculate popularity values for a plurality of network files, said popularity values based on a number of requests for each of said files over a period of time; and
    cache a subset of said plurality of network files based on said calculated popularity values.

21. The article of manufacture as in claim 20 including additional instructions to cause said processor to:
    prune one of said requests from said popularity value calculation if a subsequent request for a particular file is not received after a specified period of time.

22. The article of manufacture as in claim 20 including additional instructions to cause said processor to:
    calculate popularity values for files stored in said cache; and
    replace one or more of said files in said cache with one or more of said plurality of files not in said cache having higher popularity values when said cache is full.

23. The article of manufacture as in claim 20 including additional instructions to cause said processor to:
    store a popularity value associated with each file in a file request history list.

24. The article of manufacture as in claim 23 wherein said popularity values are calculated for each file after a predetermined miss-count threshold is reached.

25. The article of manufacture as in claim 20 wherein said popularity values are calculated after a predetermined period of time.

26. The article of manufacture as in claim 20 including additional instructions to cause said processor to calculate popularity values using the equation: Popularity=Number of Requests/Elapsed Time.

27. The article of manufacture as in claim 20 including additional instructions to cause said processor to factor in file size when calculating popularity values.

28. The article of manufacture as in claim 20 including additional instructions to cause said processor to factor in a required bitrate at which said files are to be transmitted to end users when calculating popularity values.

29. The article of manufacture as in claim 20 including additional instructions to cause said processor to factor in identities of content providers providing said files when calculating popularity values.

* * * * *